United States Patent [19]
Iida et al.

[11] Patent Number: 5,184,167
[45] Date of Patent: Feb. 2, 1993

[54] DISTANCE METERING DEVICE OF A CAMERA

[75] Inventors: Yoshikazu Iida, Chigasaki; Toru Kosaka, Zama; Hiroyuki Tsuru, Tokyo; Riichi Higaki, Kawasaki; Akira Katayama, Koganei, all of Japan

[73] Assignee: Nikon Corporation, Tokyo, Japan

[21] Appl. No.: 810,826

[22] Filed: Dec. 20, 1991

[51] Int. Cl.$^5$ .............................................. G03B 3/00
[52] U.S. Cl. .................................... 354/403; 354/67; 354/131; 354/266
[58] Field of Search ................. 354/403, 67, 162, 266, 354/267.1, 269, 131, 402

[56] References Cited

U.S. PATENT DOCUMENTS 4,933,700  6/1990  Ikeda et al. ..................... 354/402 X
5,121,151  6/1992  Kawabata et al. .................. 354/402

FOREIGN PATENT DOCUMENTS 2-160227  6/1990  Japan .

Primary Examiner—Michael L. Gellner
Assistant Examiner—Jae N. Noh
Attorney, Agent, or Firm—Shaprio and Shapiro

[57] ABSTRACT

A distance metering device of a camera eliminates a troublesome re-setting operation when a remote controller is used as a cable release and avoids the creation of defocused photograph when the remote controller is used as a self-timer.

When a first remote control signal receiver is selected, that is, when the remote controller is to be used as the self-timer, a distance metering mode of a multi-point distance metering device is forcibly switched to a multi-point distance metering mode, and when a second remote control signal receiver is selected, that is, when the remote controller is to be used as the cable release, the forced switching is not done.

2 Claims, 4 Drawing Sheets

DISTANCE METERING DEVICE OF A CAMERA

BACKGROUND OF THE INVENTION

Field of the Invention

The present invention relates to a distance metering device of a camera which meters distances to a plurality of areas in a photographing field and permits remote controlled photographing.

Related Background Art

A camera having a multi-point distance metering function which meters distances to a plurality of points in a photographing field to determine an optimum in-focus position based on the distance metering data of the respective points in order to permit a beginner photographer to easily photograph has been known.

A camera which switches a distance metering mode among a multi-point distance metering mode, a one-point distance metering mode and a forced infinite mode (a lens is set to an infinite position without distance metering) and permits releasing of a shutter from a remote position by using a remote controlled transmitter (remote controller) has also been known.

In a camera disclosed in Japanese Laid-Open Patent Application No. 2-160227, the distance metering mode is automatically switched to the multi-point distance metering mode in the remote controlled photographing so that the in-focus position is set based on the distance metering data for a plurality of areas in the photographing field. Thus, even in the remote controlled photographing in which the photographer cannot check the field through a finder, the defocusing caused by the fact no object is located in the center of the image field can be prevented.

The camera disclosed in the above-identified patent application also has a distance metering mode which permits an remote controller operator to specify a distance metering area in the remote controlled photographing so that the distance to the point specified by the operator is metered and the in-focus position is set based on the distance metering data. Accordingly, the will of the remote controller operator can be reflected to the photographing.

However, sicne this camera automatically switches to the multi-point distance metering mode when the remote controller is used, the distance metering mode must be set again when the one-point distance metering mode is desired by using the remote controller as a cable release. Thus, the operation is complex.

In order to solve the above problem, it may be possible not to use any forced switching. However, when the remote controller is used as a self-timer and if the one-point distance metering mode or the forced infinite mode is inadvertently selected, there is a higher possibility that an object other than one to be focused is focused than that in the multi-point distance metering mode, and a defocused photograph is produced.

SUMMARY OF THE INVENTION

It is an object of the present invention to provide a distance metering device of a camera which does not need re-setting when the remote controller is used as a cable release and which does not cause a defocused photograph when the remote controller is used as a self-timer.

A distance metering device of a camera according to a first embodiment of the present invention comprises:
a multi-point distance metering circuit having a multi-point distance metering mode for metering distances to a plurality of points in a photographing field and a one-point distance metering mode for metering a distance to only one point; a first remote control siganl receiver having a directivity to the photographing field, for receiving a signal transmitted from a remote control transmitter; a second remote control signal receiver having a receiving sensitivity to a remote control transmitter located outside of the photographing field; a remote control signal receiver selector for selecting one of the first and second remote control signal receives; and
a controller for forcibly switching the distance metering mode of the multi-point distance metering means to the multi-point distance metering mode when the first remote control signal receiver is selected by the remote control signal receiver selector.

A distance metering device of a camera according to a second embodiment of the present invention comprises:
a multi-point distance metering circuit having a multi-point distance metering mode for metering distances to a plurality of points in a photographing field and a one-point distance metering mode for metering a distance to only one point; a first remote control signal receiver having a directivity to the photographing field, for receiving a signal transmitted from a remote control transmitter; a second remote control signal receiver having a receiving sensitivity to a remote control transmitter located outside of the photographing field; a comparator for comparing magnitudes of signals transmitted from the remote control transmitter to the first remote control signal receiver and the second remote control signal receiver; and a controller for forcibly switching the distance metering mode of the multi-point distance metering means to the multi-point distance metering mode when the comparator determines that the signal received by the first remote control signal receiver is larger.

In accordance with the distance metering device of the first embodiment of the present invention, when the first remote control signal receiver is selected, that is, when the remote controller is used as the self-timer, the distance metering mode is forcibly switched to the multi-point distance metering mode. Thus, the focusing is made based on the distance metering data for a plurality of points in the photographing field.

When the second remote control signal receiver is selected, that is, when the remote controller is present beyond the photographing field of the photographing lens, the distance metering mode is not forcibly switched and a photographer can select a desired distance metering mode.

In accordance with the distance metering device of the second embodiment of the present invention, signals received by the first remote control signal receiver and the second remote control signal receiver are compared by the comparator, and if the signal received by the first remote control signal receiver is larger, the distance metering mode is forcibly switched to the multi-point distance metering mode. Thus, the distance metering mode can be automatically switched depending on the position of the remote controller operator.

DETAILED DESCRIPTION OF THE PREFERRED EMBODIMENTS

Figure 1:
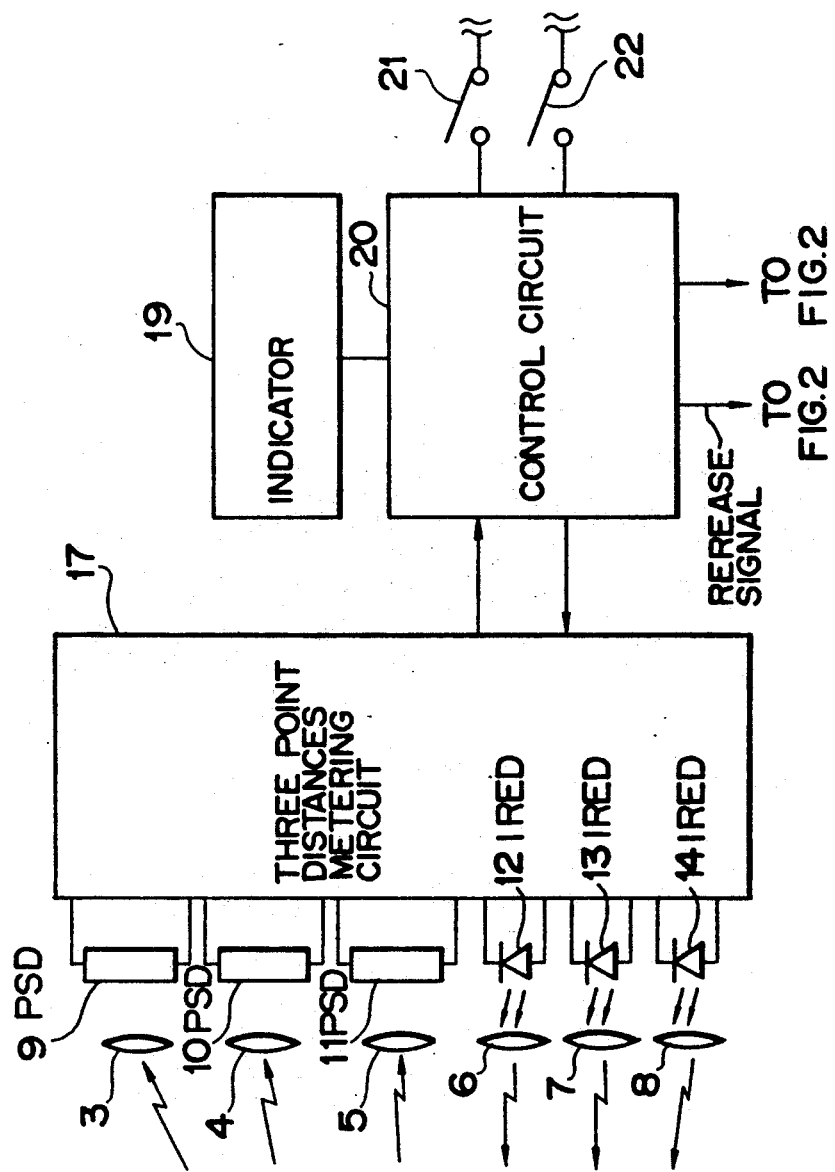
FIG. 1 shows a block diagram of a circuit configuration of a first embodiment of the distance metering device of the camera of the present invention.
Figure 2:
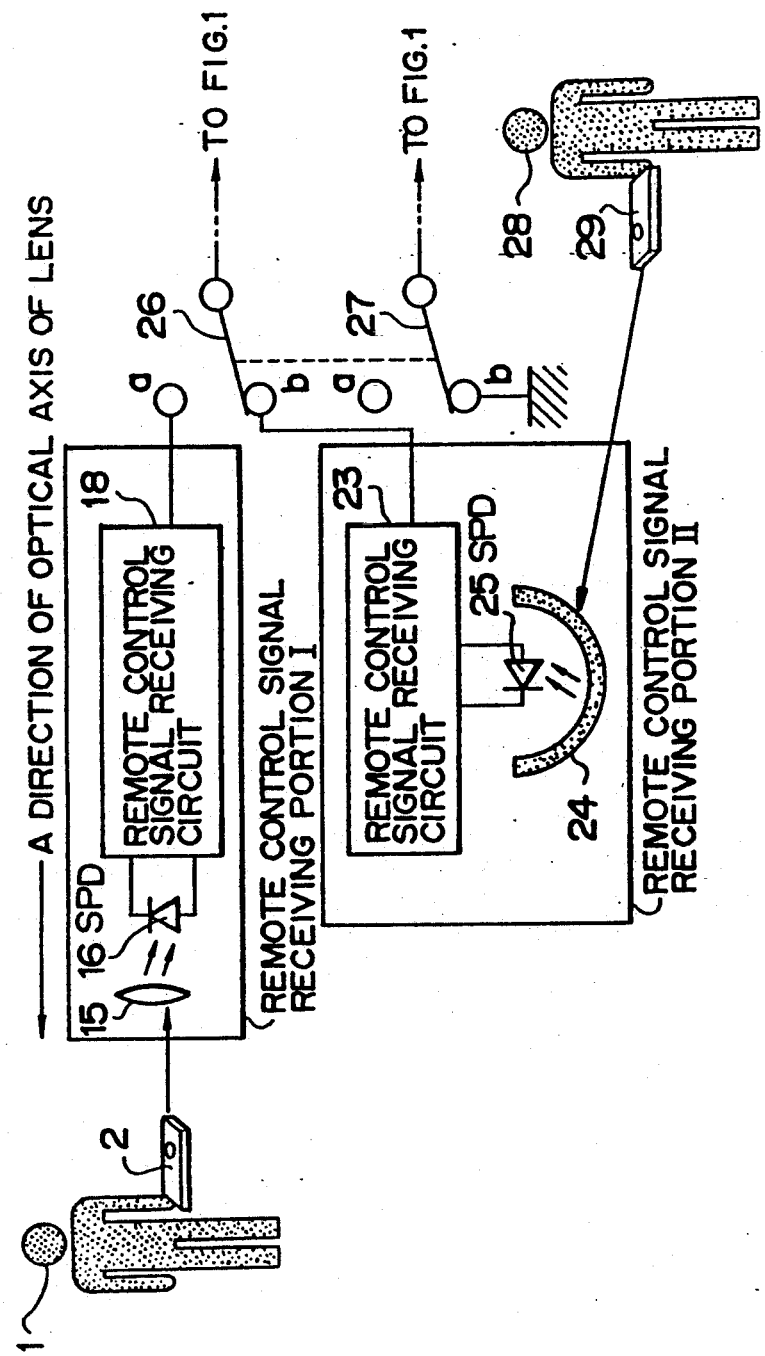
FIG. 2 shows a block diagram of a circuit configuration of a remote control signal receiver connected to the distance metering device of FIG. 1.

FIG. 1 shows a block diagram of the circuit configuration of the first embodiment of the distance metering device of the camera of the present invention, and FIG. 2 shows a circuit configuration of the remote control signal receiver connected to the distance metering device of FIG. 1.

The distance metering device of the camera in accordance with the present embodiment comprise a control circuit 20 as a main unit as shown in FIGS. 1 and 2 Connected to the control circuit 20 are a 3-point distance metering circuit 17, a first remote control signal receiver 18, a second remote control signal receiver 23, a display 19, a distance metering mode switch 21 and a remote controller mode switch 22. A release button, a shutter and a lens driver are also connected to the control circuit 20 although they are not shown in FIG. 1.

IRED's (infrared light emitting diodes) 12, 13 and 14 which are arranged at predetermined positions on a camera body (not shown) are connected to the 3-point distance metering circuit 17, and they irradiate infrared light spots to an object in front of the camera in response to a command signal from the 3-point distance metering circuit 17. A projection lens 6 is mounted on the camera body (not shown) in front of the IRED 12 so that when the IRED 12 is turned on, the infrared light passes through the projection lens 6 and are directed to substantially center of the photographing field.

Projection lenses 7 and 8 are also mounted in front of the IRED's 13 and 14 so that when the IRED's 13 and 14 are turned on, the infrared light pass through the projection lenses 7 and 8 and are directed to slightly right side and slightly left side, respectively, of the center of the photographing field.

PSD's (photo-sensing devices) 9, 10 and 11 which sense reflection lights from the object are further connected to the 3-point distance metering circuit 17 and focusing lenses 3, 4 and 5 are arranged in front of them. The PSD's 9, 10 and 11 senses the reflection lights of the infrared lights irradiated by the IRED's 12, 13 and 14 through the focusing lenses 3, 4 and 5, convert them to photo-currents which are outputted to the 3-point distance metering circuit 17.

The 3-point distance metering circuit 17 processes the input photo-current for each of the distance metering points, calculates distance data to each distance metering point and supplies the results to the control circuit 20. Remote control signal receivers I and II shown in FIG. 2 and to be explained later are connected to the control circuit 20 through a switch 26. The connection of the remote control signal receives I and II to the control circuit 20 is switched by the switch 26.

As shown in FIG. 2, a remote control signal receiver circuit comprises the remote control signal receivers I and II. The remote control signal receiver I comprises an SPD (silicon photo-diode) 16, a lens 15 and a remote control signal receive circuit 18. The SPD 16 is arranged to exhibit a photo-sensing sensitivity in the optical axis direction of the photographing lens.

The SPD 16 senses the infrared light irradiated from the remote controller 2 through the lens 15, supplies a signal to the remote control signal receiver circuit 18, which processes the signal to supply a command signal to the control circuit 20 in accordance with the type of signal sensed.

For example, when the operator 1 depresses a release button of the remote controller 2, a release command signal is sent from the remote controller 2, and the SPD 16 senses the infrared ray and the release signal is supplied to the control circuit 20 after the signal processing by the remote control signal receiver circuit 18.

The remote control signal receiver II comprises a remote control signal receiver circuit 23, a dome-shaped diffusion window 24 and an SPD (selicon photo-diode) 25. Since the SPD 25 senses the infrared ray through the diffusion window 24, it exhibits a photo-sensing sensitivity in every direction along the diffusion window 24.

The switch 26 is externally actuable and switches the connection between the remote control signal receives I and II and the control circuit 20. A switch 27 is linked to the switch 26 and inform to the control circuit 20 which one of the receivers is selected.

When the switch 26 is thrown to a position a, only the remote control singal receiver I can sense the infrared ray. Thus, when the remote control signal receiver I is selected, the remote control can be done only by the operator 1 who is on the optical axis of the photographing lens as shown in FIG. 2.

When the switch 26 is thrown to a position b, only the remote control signal receiver II can sense the infrared ray. When the remote control signal receiver II is selected, the infrared ray may be sensed on other than the optical axis of the photographing lens so that the position of the operator 28 who operates the remote controller 29 is not limited. Thus, when the remote controller is to be used as a cable release the photographing with high freedom is attained because the position of operation is not limited.

The distance metering mode switch 21 connected to the control circuit 20 has three modes, a 3-point distance metering mode in which a distance is metered based on distance data to three points, a one-point distance metering mode in which a distance is metered based on only distance data to the center point, and a forced infinite mode in which the photographing lens is forcibly set to infinite.

The modes are cyclically switched in the sequence of 3-point distance metering mode, one-point distance metering mode and forced infinite mode by sequentially turning on the distance metering mode switch 21.

A display 19 is connected to the control circuit 20 to indicate the 3-point distance metering mode, the one-point distance metering mode and the forced infinite mode.

Figure 3:
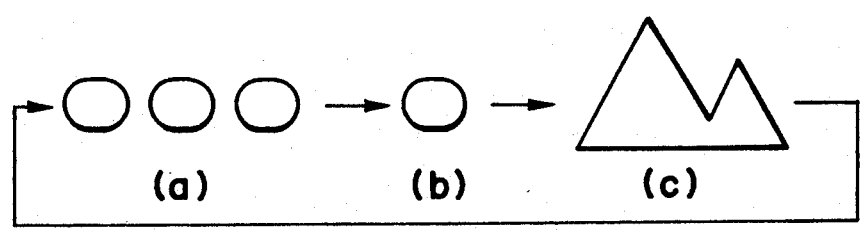
FIG. 3 shows modes displayed on a display.

FIG. 3 shows display of the respective modes which are displayed on the display 19. The display is switched by the cyclic switching of the distance metering mode switch 21. FIG. 3(a) shows the 3-point distance metering mode, FIG. 3(b) shows the one-point distance metering mode, and FIG. 3(c) shows the forced infinite mode.

The remote control mode switch 22 is also connected to the control circuit 20. The operator may set the mode of the camera to a normal photographing mode or a remote control photographing mode by switching the remote control mode switch 22 mounted at a predetermined position on the camera.

Accordingly, when the remote control mode switch 22 is turned on, the remote control photographing mode is set to stand by the reception of the signal transmitted from the remote controller 2, and when the remote control mode switch 22 is turned off, the normal photographing mode is set to permit the photographing by a release button (not shown).

The operation of the distance metering device of the camera in accordance with the present invention is now explained for the normal photographing mode in which the remote control mode switch 22 is turned off and the remote control photographing mode in which the remote control mode switch 22 is turned on.

It is first assumed that the remote control mode switch 22 is set to the normal photographing mode and the distance metering mode is set to the 3-point distance metering mode. When the operator depresses the release button under the 3-point distance metering mode, a preparatory operation for the photographing is carried out under a semi-depression state of the release button so that the 3-point distance metering circuit 17 turns on the IRED's 12, 13 and 14 to irradiate the infrared rays to the object.

The PSD's 9, 10 and 11 sense the infrared rays reflected by the object, convert them to the photocurrents, and the 3-point distance metering circuit 17 processes the currents to calculate the distance data to the three points and supplies the result to the control circuit 20. The control circuit 20 processes the distance data of the respective points by a predetermined process sequence to determine an optimum in-focus position which fits to the photographing condition.

A brightness of the object is measured by an AE circuit (not shown) to determine a shutter speed and an iris value, and the control circuit 20 controls the amount of lens drive and the exposure of the shutter based on the previously determined in-focus position and the brightness of the object. Then, the release button is fully depressed to the end of stroke carry out the photographing operation.

When the distance metering mode switch 21 is set to the one-point distance metering mode, the three-point distance metering described above is changed to the one-point distance metering and the infrared ray is irradiated from only the IRED 13. The PSD 10 senses the reflection light and the 3-point distance metering circuit 17 processes it to calculate the distance data.

The photographing operation is carried out based on the one-point distance data through a similar process to that for the 3-point distance metering. When the distance metering mode switch 21 is set to the forced infinite mode, the control circuit 20 sets the photographing lens to infinite without any distance metering operation.

The forced infinite mode is used for photographing a distant object and it is used for the photographing under a condition where exact distance metering is difficult to attain (for example, photographing through a window). Other operations are similar to those for the 3-point distance metering.

The operation of the remote control photographing mode is now explained for a case where the remote controller is used as a self-timer so that the operator of the remote controller is photographed as an object, and a case where the remote controller is used as a cable release and the operator of the remote controller need not be photographed as the object.

The operation when the remote controller is used as the self-timer is first explained. In FIG. 2, when the remote controller 2 is to be used as the self-timer, the operator 1 switches the switch 26 to the position a so that the remote control signal receiver I can receive the signal transmitted from the remote controller, and further turns on the remote control mode switch 22 to set the camera to the remote control photographing mode.

When the remote control photographing mode is set, the control circuit 20 forcibly set the distance metering mode to the 3-point distance metering mode without regard to the setting of the distance metering mode switch 21. Thus, the display 19 displays as shown in FIG. 3(a) and the 3-point distance metering mode is maintained even if the distance metering mode switch 21 is depressed again.

As shown in FIG. 2, when the operator 1 depresses the transmission button for the release of the remote controller 2, the light signal is transmitted from the remote controller 2 and the SPD 16 of the remote control signal receiver I senses it. The SPD supplies the signal to the remote control receiver circuit 18, which processes the signal and supplies a release command signal to the control circuit 20.

Since the distance metering is carried out in the 3-point distance metering mode, an optimum in-focus position which fits to the photographing condition is determined. After the brightness measurement by the AE circuit (not shown), the exposure operation is carried out at the determined shutter speed and iris value.

In the distance metering device of the camera in accordance with the present embodiment, the remote control mode switch 22 is turned on to set the remote control photographing mode and the distance metering mode is set to the 3-point distance metering mode. Accordingly, the troublesome setting of the photographing mode can be avoided.

The operation when the switch 26 is thrown to the position b to use the remote controller 29 as the cable release (the photographer is not photographed as the object) is explained below. When the remote controller 29 is used as the cable release, the position to operate the remote controller 29 should not be limited to assure the freedom of photographing. Accordingly, the photographer switches the switch 26 to the position b to select the remote control signal receiver II which has an all-direction sensitivity.

Thus, the switch 27 is switched by the linkage to the switch 26 and the control circuit 20 recognizes the reception of the signal from the remote control signal receiver II. Unlike the operation of the control circuit 20 when the switch 26 is switched to the position a, the control circuit 20 meters the distance in the preset distance metering mode without switching it to the 3-point distance metering mode.

When the remote controller is used as the cable release or when the object to be photographed is limited such as when the remote control photographing is mode, more exact distance metering may be attained by setting the object to be focused, by the operator. In this manner, troublesome re-setting operation is avoided and the freedom of photographing when the remote controller is used as the cable release is not sacrificed.

A second embodiment of the present invention is now explained.

Figure 4:
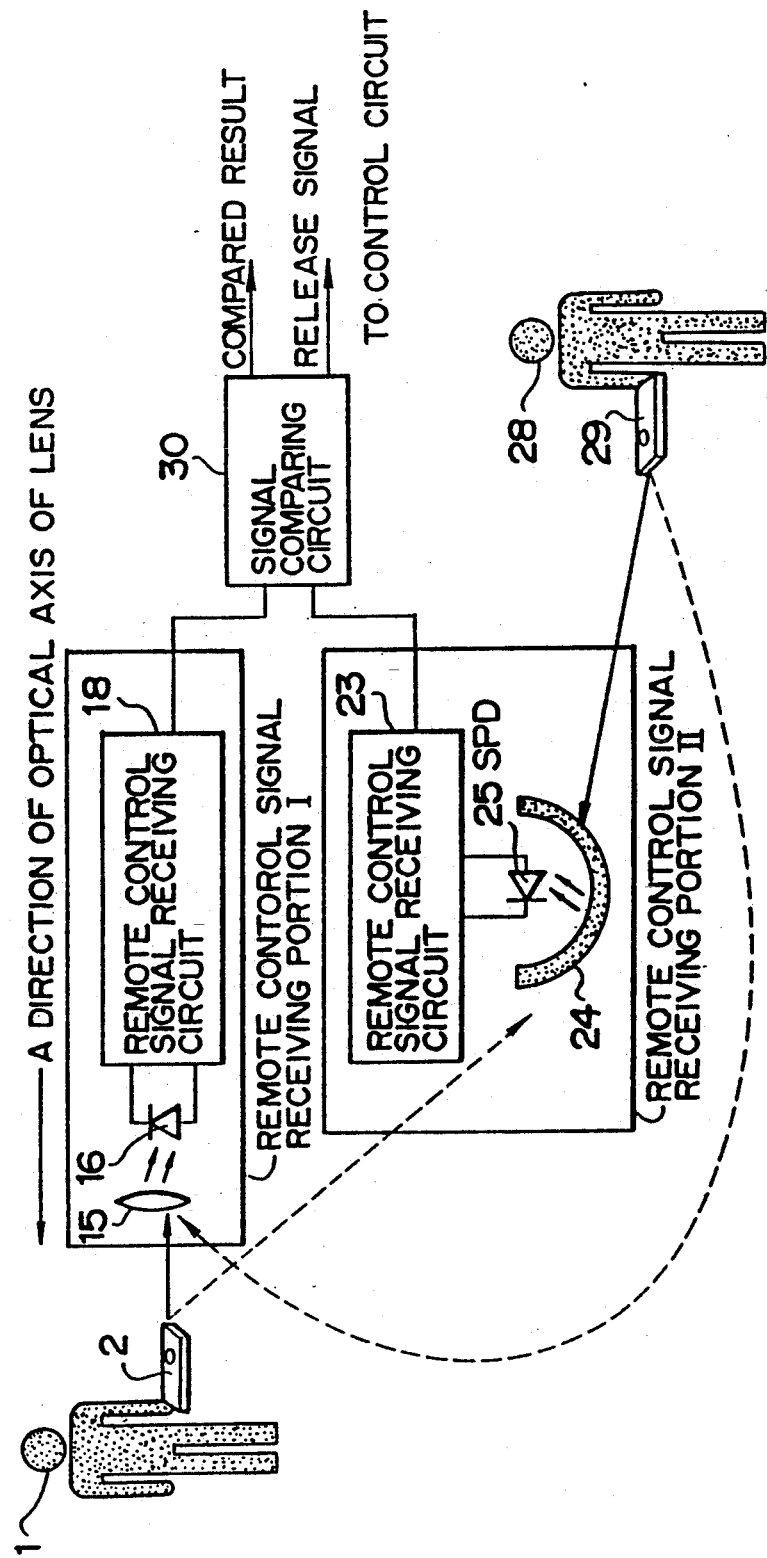
FIG. 4 shows a block diagram of a circuit configuration of a second embodiment of the distance metering device of the camera of the present invention.

FIG. 4 shows a block diagram of a circuit configuration of the second mebodiment of the distance metering device of the camera in accordance with the present invention. The like elements to those shown in the first embodiment are not shown and only the different points are shown in the block diagram.

In the distance metering device of the camera shown in FIG. 4, the remote control signal receiver I and the remote control signal receiver II are directly connected to the control circuit 20 shown in FIG. 1 through a comparator 30, and unlike the first embodiment, they are not connected through the switch 26 or the switch 27. Like the first embodiment, the camera has the 3-point distance metering function and two remote control signal receivers I and II.

Like the first embodiment, the remote control signal receiver I and the remote control signal receiver II have different directions of photo-sensing sensitivity. The remote control signal receiver I can receive the transmitted signal when the operator is present on the optical axis of the photographing lens, and the remote control signal receiver II can receive the transmitted signal without regard to the relative direction between the photographing lens and the operator.

The two remote control signal receivers I and II are connected to the comparator 30 and supply the signals transmitted from the remote controllers 2 and 29 to the comparator 30 in the remote control photographing mode. The comparator 30 compares the magnitudes of the signals supplied from the remote control signal receivers I and II and supplies the comparison result to the control circuit 20 shown in FIG. 1.

The comparator 30 supplies a release signal to the control circuit 20 when a release command signal is supplied from at least one of the two receivers I and II.

The operation of the distance metering device thus configured is explained below. The operation when the remote control switch 22 is turned off is same as that of the first embodiment and the explanation thereof is omitted. The operation when the remote control photographing mode is set is now described.

When the operator 1 is to be photographed as the object, that is, when the remote controller 2 is used as the self-timer, the operator 1 must be present within the photographing field of the photographing lens as shown in FIG. 4. When the operator 1 operates the remote controller 2 to command the releasing to the camera, the signal transmitted from the remote controller 2 is received by the remote control signal receivers I and II as shown in FIG. 4 and the received signals are supplied to the comparator 30.

The comparator 30 compares the magnitudes of the signals supplied from the receivers I and II and supplies the comparison result to the control circuit 20. Since the remote controller 2 is present within the sensing range of the receiver I, the signal received by the receiver I is naturally larger than the signal received by the receiver II.

As a result, the comparison result which indicates that the received signal of the receiver I is larger than the received signal of the receiver II is supplied to the control circuit 20. When the control circuit 20 receives such a comparison result, it forcibly switches the distance metering mode to the 3-point distance metering mode without regard to the setting of the distance metering mode switch 21 to carry out the distance metering by the 3-point distance metering circuit 17 (not shown in FIG. 4).

The 3-point distance metering circuit 17 meters the distances to the three points in the photographing field and supplies the distance data to the three points to the control circuit 20, which calculates an optimum in-focus position by the predetermined process.

The switching to the 3-point distance metering mode is done only after the comparison result which indicates that the signal received by the receiver I is larger. In the remote control signal stand-by mode, any mode may be set by the operator by operating the distance metering mode switch 21. Like the first embodiment, the brightness is measured following to the 3-point distance metering, and the exposure is set.

The operation when the remote controller is used as the cable release or the photograph is taken while the camera is located away from the operator (the operator 28 is not photographed as the object) is now explained.

As shown in FIG. 4, the light signal transmitted from the remote controller 29 is received by both the remote control signal receivers I and II as it is in the previous case. However, since the remote controller 29 is located outside of the sensing range of the receiver I, the signal received by the receiver I is smaller than the signal received by the receiver II.

As a result, the signal supplied from the remote control signal receiver II to the comparator 30 is naturally larger than that supplied from the receiver I, and the comparison result is informed to the control circuit 20.

When the control circuit 20 recieves such a comparison result, it does not forcibly switch the distance metering mode to the 3-point distance metering mode as it does when the signal of the receiver I is larger but it meters the distance in the preset distance metering mode. The brightness is measured following to the distance metering and the exposure is set.

In the distance metering device of the second embodiment, whether the remote control signal has been transmitted from the photographing field or not is determined by the comparator 30 and the control circuit 20. If it has been done from the photographing field, the distance metering mode is automatically set to the 3-point distance metering mode to carry out the 3-point distance metering.

Thus, when the remote controller is used as the self-timer, the auto-focusing control by the 3-point distance metering is attained without manually switching the distance metering mode and the creation of defocused photograph caused by the fact no object is located in the center of the image field is prevented. When the operator is not to be photographed as the object, the automatic switching of the distance metering mode is not done and the photograph is taken in any desired distance metering mode. Thus, the freedom of photographing is not sacrified.

In the second embodiment, the magnitudes of the signals from the remote control signal receivers I and II are simply compared by the comparator 30, alternatively, a comparison level may be set in accordance with a difference between the sensitivities of the receivers and if the signal from the receiver I is more than two times as large as the signal from the receiver II, it may be determined that the operator has operated the remote controller within the photographing field. In this manner, more exact determination is attained.

In accordance with the distance metering device of the camera of the present invention, when the first remote control signal receiver which receives the signal transmitted from the remote controller located within the photographing field of the photographing lens is selected, the distance metering mode is forcibly switched to the multi-point distance metering mode. Thus, when the remote controller operator is to be included in the object, the focusing is adjusted based on the distance data to the plurality of points in the photographing field and the creation of defocused photograph caused by the fact no object is located in the center of the image field is prevented.

When the remote controller is used as the cable release, that is, when the second remote control signal receiver is selected, the forced switching of the distance metering mode is not done and a complex operation such as the switching to the multi-point distance metering mode followed by the switching to the one-point distance metering mode, is not required.

Further, the position of the remote controller is determined by the comparator, and when the remote controller is present within the photographing field of the photographing lens, the distance metering mode is forcibly switched to the multi-point distance metering mode. Thus, the distance metering mode is automatically switched in accordance with the position of the remote controller operator and the remote controlled photographing may be easily attained without complex operation.

What is claimed is:

1. A distance metering device of a camera comprising:
    multi-point distance metering means having a multi-point distance metering mode for metering distances to a plurality of points in a photographing field and a one-point distance metering mode for metering a distance to only one point;
    first remote control signal receiving means having a directivity to the photographing field, for receiving a signal transmitted from a remote control transmitter;
    second remote control signal receiving means having a receiving sensitivity to a remote control transmitter located outside of the photographing field;
    remote control signal receiver selection means for selecting one of said first and second remote control singal receiving means; and
    control means for forcibly switching the distance metering mode of said multi-point distance metering means to the multi-point distance metering mode when said first remote control signal receiving means is selected by said remote control signal receiver selection means.

2. A distance metering device of a camera comprising:
    multi-point distance metering means having a multi-point distance metering mode for metering distances to a plurality of points in a photographing field and a one-point distance metering mode for metering a distance to only one point;
    first remote control signal receiving means having a directivity to the photographing field, for receiving a signal transmitted from a remote control transmitter;
    second remote control signal receiving means having a receiving sensitivity to a remote control transmitter located outside of the photographing field;
    compare means for comparing magnitudes of signals transmitted from said remote control transmitter to said first remote control signal receiving means and said second remote control signal receiving means; and
    control means for forcibly switching the distance metering mode of said multi-point distance metering means to the multi-point distance metering mode when said compare means determines that the signal received by said first remote control signal receiving means is larger.

* * * * *